United States Patent
Blonde et al.

(10) Patent No.: US 7,461,940 B2
(45) Date of Patent: Dec. 9, 2008

(54) ILLUMINATION SYSTEM FOR DISPLAYING IMAGES WITHOUT COLOR BREAK

(75) Inventors: Laurent Blonde, Thorigné-Fouillard (FR); Didier Doyen, La Bouexière (FR); Khaled Sarayeddine, Nouvoitou (FR)

(73) Assignee: Thomson Licensing, Boulogne Billancourt (FR)

(*) Notice: Subject to any disclaimer, the term of this patent is extended or adjusted under 35 U.S.C. 154(b) by 92 days.

(21) Appl. No.: 10/532,179

(22) PCT Filed: Oct. 13, 2003

(86) PCT No.: PCT/EP03/50708

§ 371 (c)(1),
(2), (4) Date: Sep. 12, 2005

(87) PCT Pub. No.: WO2004/038499

PCT Pub. Date: May 6, 2004

(65) Prior Publication Data

US 2006/0098169 A1 May 11, 2006

(30) Foreign Application Priority Data

Oct. 28, 2002 (FR) .................................. 02 13981

(51) Int. Cl.
*G03B 21/14* (2006.01)
(52) U.S. Cl. ............................. 353/84; 353/20; 353/31; 353/34; 348/742; 349/5; 349/18
(58) Field of Classification Search ................. None
See application file for complete search history.

(56) References Cited

U.S. PATENT DOCUMENTS

| | | | |
|---|---|---|---|
| 5,416,514 A | 5/1995 | Janssen et al. | |
| 5,684,498 A * | 11/1997 | Welch et al. | 345/8 |
| 6,215,579 B1 * | 4/2001 | Bloom et al. | 359/298 |
| 6,273,571 B1 * | 8/2001 | Sharp et al. | 353/122 |
| 2002/0008812 A1 | 1/2002 | Conner et al. | |
| 2002/0024618 A1 | 2/2002 | Imai | |

FOREIGN PATENT DOCUMENTS

EP 0777 390 6/1997

OTHER PUBLICATIONS

Search Report Dated Mar. 3, 2004.

* cited by examiner

*Primary Examiner*—W. B. Perkey
*Assistant Examiner*—Warren K Fenwick
(74) *Attorney, Agent, or Firm*—Joseph J. Laks; Harvey Fried; Patricia Verlangieri (57) ABSTRACT

The invention concerns an image display system comprising: a light source emitting an illuminating laser beam, a spatial light modulator controlled by control video signals corresponding to a succession of image frames; a matrix filter consisting of an array of different elementary color filters, illuminated by said illuminating beam and transmitting a spatially color-filtered beam to the spatial light modulator, an image of said filter being produced on an input surface of the spatial light modulator; means for displacing the filter image on the input of the spatial light modulator; and a control device for controlling at least one sequence of displacements of the filter image upon each image frame display.

12 Claims, 10 Drawing Sheets

IMAGES OF THE FILTER ON THE MODULATOR dx=4 ; dy=0

| 100 | 10 | 1 | 1 | 100 | 10 | 1 | 1 | 100 | 10 | 1 | 1 | 100 | 10 |
|---|---|---|---|---|---|---|---|---|---|---|---|---|---|
| 1 | 1 | 100 | 10 | 1 | 1 | 100 | 10 | 1 | 1 | 100 | 10 | 1 | 1 |
| 1 | 100 | 10 | 1 | 1 | 100 | 10 | 1 | 1 | 100 | 10 | 1 | 1 | 100 |
| 10 | 1 | 1 | 100 | 10 | 1 | 1 | 100 | 10 | 1 | 1 | 100 | 10 | 1 |
| 100 | 10 | 1 | 1 | 100 | 10 | 1 | 1 | 100 | 10 | 1 | 1 | 100 | 10 |
| 1 | 1 | 100 | 10 | 1 | 1 | 100 | 10 | 1 | 1 | 100 | 10 | 1 | 1 |
| 1 | 100 | 10 | 1 | 1 | 100 | 10 | 1 | 1 | 100 | 10 | 1 | 1 | 100 |
| 10 | 1 | 1 | 100 | 10 | 1 | 1 | 100 | 10 | 1 | 1 | 100 | 10 | 1 |
| 100 | 10 | 1 | 1 | 100 | 10 | 1 | 1 | 100 | 10 | 1 | 1 | 100 | 10 |
| 1 | 1 | 100 | 10 | 1 | 1 | 100 | 10 | 1 | 1 | 100 | 10 | 1 | 1 |

Fig. 6i

LIGHT TRANSMITTED BY THE MODULATOR

| 212 | 122 | 212 | 221 | 212 | 212 | 122 | 212 | 221 | 212 | 212 | 221 | 122 |
|---|---|---|---|---|---|---|---|---|---|---|---|---|
| 212 | 221 | 212 | 122 | 212 | 212 | 221 | 212 | 122 | 212 | 212 | 122 | 221 |
| 122 | 212 | 221 | 212 | 122 | 212 | 212 | 221 | 212 | 122 | 212 | 221 | 212 |
| 221 | 212 | 122 | 212 | 221 | 212 | 212 | 122 | 212 | 221 | 212 | 122 | 212 |
| 212 | 122 | 212 | 221 | 212 | 212 | 122 | 212 | 221 | 212 | 221 | 212 | 122 |
| 212 | 221 | 212 | 122 | 212 | 212 | 221 | 212 | 122 | 212 | 212 | 122 | 221 |
| 221 | 212 | 122 | 212 | 221 | 212 | 212 | 122 | 212 | 221 | 212 | 122 | 212 |
| 122 | 212 | 221 | 212 | 122 | 212 | 212 | 221 | 212 | 122 | 212 | 221 | 212 |
| 212 | 122 | 212 | 221 | 212 | 212 | 122 | 212 | 221 | 212 | 221 | 212 | 122 |
| 212 | 221 | 212 | 122 | 212 | 212 | 221 | 212 | 122 | 212 | 122 | 221 | 212 |

Fig. 6j dx=3 ; dy=0

| 10 | 100 | 10 | 1 | 1 | 100 | 10 | 1 | 1 | 100 | 10 | 1 | 1 | 100 |
|---|---|---|---|---|---|---|---|---|---|---|---|---|---|
| 10 | 1 | 1 | 100 | 10 | 1 | 1 | 100 | 10 | 1 | 1 | 100 | 10 | 1 |
| 100 | 100 | 10 | 1 | 1 | 100 | 10 | 1 | 1 | 100 | 10 | 1 | 1 | 100 |
| 1 | 1 | 100 | 10 | 1 | 1 | 100 | 10 | 1 | 1 | 100 | 10 | 1 | 1 |
| 10 | 1 | 1 | 100 | 10 | 1 | 1 | 100 | 10 | 1 | 1 | 100 | 10 | 1 |
| 1 | 100 | 10 | 1 | 1 | 100 | 10 | 1 | 1 | 100 | 10 | 1 | 1 | 100 |
| 10 | 1 | 1 | 100 | 10 | 1 | 1 | 100 | 10 | 1 | 1 | 100 | 10 | 1 |
| 1 | 100 | 10 | 1 | 1 | 100 | 10 | 1 | 1 | 100 | 10 | 1 | 1 | 100 |
| 100 | 10 | 1 | 1 | 100 | 10 | 1 | 1 | 100 | 10 | 1 | 1 | 100 | 10 |
| 10 | 1 | 1 | 100 | 10 | 1 | 1 | 100 | 10 | 1 | 1 | 100 | 10 | 1 |

Fig. 6k

| 222 | 222 | 222 | 222 | 222 | 222 | 222 | 222 | 222 | 222 | 222 | 222 | 222 |
|---|---|---|---|---|---|---|---|---|---|---|---|---|
| 222 | 222 | 222 | 222 | 222 | 222 | 222 | 222 | 222 | 222 | 222 | 222 | 222 |
| 222 | 222 | 222 | 222 | 222 | 222 | 222 | 222 | 222 | 222 | 222 | 222 | 222 |
| 222 | 222 | 222 | 222 | 222 | 222 | 222 | 222 | 222 | 222 | 222 | 222 | 222 |
| 222 | 222 | 222 | 222 | 222 | 222 | 222 | 222 | 222 | 222 | 222 | 222 | 222 |
| 222 | 222 | 222 | 222 | 222 | 222 | 222 | 222 | 222 | 222 | 222 | 222 | 222 |
| 222 | 222 | 222 | 222 | 222 | 222 | 222 | 222 | 222 | 222 | 222 | 222 | 222 |
| 222 | 222 | 222 | 222 | 222 | 222 | 222 | 222 | 222 | 222 | 222 | 222 | 222 |
| 222 | 222 | 222 | 222 | 222 | 222 | 222 | 222 | 222 | 222 | 222 | 222 | 222 |
| 222 | 222 | 222 | 222 | 222 | 222 | 222 | 222 | 222 | 222 | 222 | 222 | 222 |

| 100 10 1 1 100 10 |
| 1 1 100 10 100 10 |
| 100 10 1 10 1 100 |
| 1 100 10 100 10 1 |
| 10 100 10 1 1 100 |
| 10 1 100 100 10 1 | dx=4, dy=0

| 212 122 212 221 221 122 |
| 212 221 221 122 212 122 |
| 122 122 212 221 212 221 |
| 221 221 122 212 122 212 |
| 122 212 122 212 221 221 |
| 221 212 221 122 122 212 |

| 100 10 1 1 100 10 |
| 1 1 100 10 100 10 |
| 100 10 1 10 1 100 |
| 1 100 10 100 10 1 |
| 10 100 10 1 1 100 |
| 10 1 100 100 10 1 |

4

| 10 100 10 1 1 100 |
| 10 1 1 100 10 100 |
| 100 100 10 1 10 1 |
| 1 1 100 10 100 10 |
| 100 10 100 10 1 1 |
| 1 10 1 100 100 10 | dx=3, dy=0

| 222 222 222 222 222 222 |
| 222 222 222 222 222 222 |
| 222 222 222 222 222 222 |
| 222 222 222 222 222 222 |
| 222 222 222 222 222 222 |
| 222 222 222 222 222 222 |

| 110 110 11 2 101 110 |
| 11 2 101 110 110 110 |
| 200 110 11 11 11 101 |
| 2 101 110 110 110 11 |
| 110 110 110 11 2 101 |
| 11 11 101 200 110 11 |

5

| 1 100 10 100 10 1 |
| 10 100 10 1 1 100 |
| 10 1 100 100 10 1 |
| 100 10 1 1 100 10 |
| 1 1 100 10 100 10 |
| 100 10 1 10 1 100 | dx=1, dy=0

| 1 100 10 100 10 1 |
| 10 100 10 1 1 100 |
| 10 1 100 100 10 1 |
| 100 10 1 1 100 10 |
| 1 1 100 10 100 10 |
| 100 10 1 10 1 100 |

| 111 210 21 102 111 111 |
| 21 102 111 111 111 210 |
| 210 111 111 111 21 102 |
| 102 111 111 111 210 21 |
| 111 111 210 21 102 111 |
| 111 21 102 210 111 111 |

6

} Integration 2

Fig. 7c

| | | | |
|---|---|---|---|
| 1 1 100 10 100 10<br>100 10 100 10 1 1<br>1 10 1 100 100 10<br>10 100 10 1 1 100<br>10 1 1 100 10 100<br>100 100 10 1 10 1<br>dx=0, dy=0 | 2 101 110 110 110 11<br>110 110 110 11 2 101<br>11 11 101 200 110 11<br>110 110 11 2 101 110<br>11 2 101 110 110 110<br>200 110 11 11 11 101 | 1 1 100 10 100 10<br>100 10 100 10 1 1<br>1 10 1 100 100 10<br>10 100 10 1 1 100<br>10 1 1 100 10 100<br>100 100 10 1 10 1<br>7 | ⎫<br>⎬ Integration 3<br>⎪ |
| 100 10 1 10 1 100<br>1 100 10 100 10 1<br>10 100 10 1 1 100<br>10 1 100 100 10 1<br>100 10 1 1 100 10<br>1 1 100 10 100 10<br>dx=1, dy=1 | 102 111 111 120 111 111<br>111 210 120 111 12 102<br>21 111 111 201 111 111<br>120 111 111 102 111 111<br>111 12 102 111 210 120<br>201 111 111 21 111 111<br>8 | 101 11 101 20 101 110<br>101 110 110 110 11 2<br>11 110 11 101 101 110<br>20 101 110 101 11 101<br>110 11 2 101 110 110<br>101 101 110 11 110 11 | ⎪ |

| | | | |
|---|---|---|---|
| 100 10 1 1 100 10<br>1 1 100 10 100 10<br>100 10 1 10 1 100<br>1 100 10 100 10 1<br>10 100 10 1 1 100<br>10 1 100 100 10 1<br>dx=4, dy=0 | 202 121 112 121 211 121<br>112 211 220 121 112 112<br>121 121 112 211 112 211<br>121 211 121 202 121 112<br>121 112 112 112 211 220<br>211 112 211 121 121 112 | 201 21 102 21 201 120<br>102 111 210 120 111 12<br>111 120 12 111 102 210<br>21 201 120 201 21 102<br>120 111 12 102 111 210<br>111 102 210 111 120 12<br>9 | ⎫<br>⎬<br>⎪ |
| 10 100 10 1 1 100<br>10 1 1 100 10 100<br>100 100 10 1 10 1<br>1 1 100 10 100 10<br>100 10 100 10 1 1<br>1 10 1 100 100 10<br>dx=3, dy=0 | 212 221 122 122 212 221<br>122 212 221 221 122 212<br>221 221 122 212 122 212<br>122 212 221 212 221 122<br>221 122 212 122 212 221<br>212 122 212 221 221 122 | 10 100 10 1 1 100<br>10 1 1 100 10 100<br>100 100 10 1 10 1<br>1 1 100 10 100 10<br>100 10 100 10 1 1<br>1 10 1 100 100 10<br>10 | ⎫<br>⎬ Integration 4<br>⎪ |
| 10 1 100 100 10 1<br>100 10 1 1 100 10<br>1 1 100 10 100 10<br>100 10 1 10 1 100<br>1 100 10 100 10 1<br>10 100 10 1 1 100<br>dx=4, dy=1 | 222 222 222 222 222 222<br>222 222 222 222 222 222<br>222 222 222 222 222 222<br>222 222 222 222 222 222<br>222 222 222 222 222 222<br>222 222 222 222 222 222 | 20 101 110 101 11 101<br>110 11 2 101 110 110<br>101 101 110 11 110 11<br>101 11 101 20 101 110<br>101 110 110 110 11 2<br>11 110 11 101 101 110<br>11 | ⎪ |

| | | |
|---|---|---|
| 1 100 10 100 10 1<br>10 100 10 1 1 100<br>10 1 100 100 10 1<br>100 10 1 1 100 10<br>1 1 100 10 100 10<br>100 10 1 10 1 100<br>dx=1, dy=0 | 1 100 10 100 10 1<br>10 100 10 1 1 100<br>10 1 100 100 10 1<br>100 10 1 1 100 10<br>1 1 100 10 100 10<br>100 10 1 10 1 100 | 21 201 120 201 21 102<br>120 111 12 102 111 210<br>111 102 210 111 120 12<br>201 21 102 21 201 120<br>102 111 210 120 111 12<br>111 120 12 111 102 210<br>12 |

ILLUMINATION SYSTEM FOR DISPLAYING IMAGES WITHOUT COLOR BREAK

This application claims the benefit, under 35 U.S.C. § 365 of International Application PCT/EP03/50708, filed Oct. 13, 2003, which was published in accordance with PCT Article 21(2) on May 6, 2004 in French and which claims the benefit of French patent application No. 0213981, filed Oct. 28, 2002.

BACKGROUND OF THE INVENTION

The invention relates to a system for displaying images with the aid of a spatial light modulator.

SUMMARY OF THE INVENTION

It applies more particularly to mono-display video back-projection or projection systems, with matrix displays and more particularly to systems employing a relay image upstream of the projection screen. It aims to improve the image quality for color sequential systems. Additionally, it makes it possible to degrade a video obtained with a camcorder that recorded the image projected on the projection screen.

Two types of mono-imager architectures are known:

a—that where all the pixels (image elements) of the imager always see the same color: "all red", "all green", or "all blue"; this is what is obtained by using a color wheel which rotates in front of the imager. This mode is dubbed "color sequential";

b—that where the scanning of the imager takes place "line by line" (case of "color scrolling"). All the pixels of a group of lines of the imager see the same color, so that, for each line, there is in succession an "all red" line, an "all green" line and an "all blue" line. This effect can be obtained by using a rotating filter having helical striped color bands.

Projection or back-projection systems can therefore arise in various configurations. The invention relates to mono-display configurations, operating in color sequential mode and able to employ a plane accessible upstream of the main imager and optically conjugate with the latter.

It is known, for example, from the document US2002/0024618, that such systems operating in color sequential mode give rise to risks of color break-up during projection, which cause the appearance of multiple and colored contours on the images displayed, when these images are moving or when the observer shifts his gaze over the projected image. These color break-ups stem from the fact that the three primary image sub-frames, red, green and blue, which, after integration by the eye, form one and the same overall polychrome image, are displayed one after the other and hence at different instants.

Document US2002/0024618 proposes a solution to this problem, in the case where each polychrome image to be displayed is distributed, not into a sequence of three monochrome sub-frames, red, green and blue, but into a sequence of four sub-frames, red, green, blue and white. This document proposes that the pixels or cells of the matrix display be grouped into groups of four adjacent pixels, and that the display be illuminated in such a way that the four pixels of each of the groups are illuminated by different colors, one in red, a second in green, a third in blue, and the fourth remaining in white. At each image sub-frame, polychrome illumination is therefore carried out which forms on the entrance face of the matrix display a mosaic of color "patches", each patch of homogeneous color corresponding to a pixel. The polychromatic image to be displayed is then composed sequentially by alternating the color of illumination of each of the pixels within each group. In this way, as indicated in paragraph 19 of this document, the colors illuminating the adjacent pixels of one and the same sub-frame are mixed by juxtaposed additive synthesis; as each sub-frame is no longer, as before, monochrome, the observer no longer perceives color break-ups when his gaze shifts over the image or when the image is moving.

The invention proposes an enhancement to the general solution taught by the document US2002/0024618 which makes it possible to obtain, in a much simpler manner than in the embodiments described in this document, polychrome illumination of the matrix display during each sub-frame: specifically, to obtain this polychrome illumination, it is proposed to use a matrix filter formed of a mosaic of elementary monochrome filters, to illuminate this filter by a generally white polychrome source, and to make the image of this filter thus illuminated on the entrance face of the spatial modulator, to use means for displacing the image of this filter from one sub-frame to the next, in such a way as to alternate the color of illumination of each of the pixels or set of pixels of this modulator.

The invention thus makes it possible to solve the problem of color break-up in a much simpler manner than in the prior art.

The invention therefore relates to a system for displaying images with the aid of a spatial light modulator comprising:
a light source emitting an illumination beam;
a spatial light modulator comprising a matrix of pixels controlled by video control signals corresponding to a succession of image frames to be displayed;
a matrix filter formed of a mosaic of elementary filters of various colors, illuminated by said illumination beam and transmitting a spatially filtered color beam to the spatial light modulator,
means for producing an image of said filter on an entrance face of the spatial light modulator;
means of displacement for displacing the image of the filter on the entrance face of the spatial light modulator and
a device for controlling these means of displacement, making it possible to control at least one sequence of displacements of the image of the filter during each image frame.

The control device is adapted to control the displacements of the image of the filter in synchronism with the video control signals of the spatial light modulator.

Preferably, each displacement of a sequence corresponds to a multiple of the dimension of the image of an elementary filter on the entrance face of the spatial modulator.

Preferably, the dimensions and the position of the elementary filters are adapted so that the image of each of them on the entrance face of the spatial modulator covers a plurality of pixels. The dimensions of each elementary filter are then such that they allow the illumination of a number of pixels of the spatial light modulator which is an integer greater than one. That is to say each elementary filter is adapted so as to simultaneously illuminate several adjacent pixels during each image sub-frame.

One of the drawbacks of the various spatial modulator illumination devices described in document US2002/0024618 is that they must be adapted to obtain, during each image sub-frame, illumination of various colors over adjacent pixels, which in practice turns out to be extremely difficult to obtain and to maintain on account of the small size of the pixels of the display. The invention makes it possible to avoid this drawback.

In practice, matters are preferably contrived so that the limits of the image of each elementary filter correspond to inter-pixel spaces on the entrance face of the modulator; color mixtures within one and the same pixel are thus avoided. Each elementary filter then makes it possible to illuminate the totality of several pixels.

The mosaic may be monodimensional, in the sense that it includes for example only one column of elementary filters of various colors; each elementary filter then forms a monochrome colored band extending over the entire width of the filter. During an image sub-frame, all the pixels of a group of rows of the spatial modulator then simultaneously see the same color. During a succession of sub-frames, each row of pixels is successively illuminated in red, in green and in blue. The invention then makes it possible to obtain in a very simple manner a scrolling of color bands over the spatial modulator.

Preferably, in order to better solve the abovementioned problem of color break-up, the mosaic is bidimensional and the monochrome elementary filters are arranged in several rows and several columns; if the spatial light modulator comprises a bidimensional matrix of pixels each formed by an optical valve and arranged in rows and columns, the direction of the image of the rows of elementary filters on the entrance face of the modulator corresponds to that of the rows of pixels, and the direction of the image of the columns of elementary filters on the entrance face of the modulator corresponds to that of the columns of pixels; the optical valves may be liquid crystal cells or micromirror elements.

According to a preferred embodiment of the invention, said mosaic is formed by the repetition of blocks of elementary filters, these blocks exhibiting identical contours and each being composed of at least two elementary filters of different colors; since all the blocks have the same contours, that is to say the same geometry, each block therefore comprises the same number of elementary filters; in the filter, the distributions of the elementary filters of different colors in the blocks may be different from one block to another. Preferably, each block comprises three elementary filters: one red, one green and one blue.

According to another variant embodiment of the invention, there is provision for a block to comprise more than two filters, which are adjacent but not aligned.

According to another variant embodiment of the invention, there is provision for a block to comprise more than two filters which are adjacent and aligned. Preferably, these blocks are then arranged in such a way that the elementary filters of like color are aligned along a direction tilted with respect to that of the rows and that of the columns of elementary filters. During the design of a filter, such blocks will therefore be offset with respect to one another so as to obtain patterns in which the elementary filters of like color are aligned along tilted directions; preferably, two rows will then be mutually interchanged and/or two columns will then be mutually interchanged. Such a filter will be easy to design and to use while scrambling the pattern formed by the groups of blocks.

Preferably, the filter comprises the same number of elementary filters of each color in the various rows and in the various columns of the filter.

Provision may also be made for the mosaic to be an assemblage of identical patterns each comprising the same number of blocks and the same number of elementary filters of each color in each of the rows and in each of the columns of elementary filters of this pattern. This will make it possible in a more dependable manner to obtain a white image for each pixel of the spatial light modulator which is in the on state. Preferably, the means of displacement are adapted for displacing the image of the mosaic-like filter transversely to the direction of the illumination beam. According to one embodiment, the means of displacement comprise a light deflection device, located between the matrix filter and the spatial light modulator; this device is adapted for displacing the image of the filter over the entrance face of the modulator; the control device thus the deflection, by the deflection device, of the spatially filtered illumination beam, thus yielding displacements of the image of the filter over the entrance face of the spatial light modulator.

Advantageously, the deflection device comprises an orientable mirror; the matrix filter and the spatial light modulator are then arranged symmetrically with respect to a beam splitting surface; the system then comprises an imaging optic receiving the light emitted by the matrix filter, retransmitting it to the mirror which reflects it toward the splitting surface via the imaging optic, which splitting surface reflects the light toward an entrance face of the spatial light modulator, an image of the matrix filter thus being formed on the entrance face of the spatial light modulator, this image being displaceable over this entrance face by rotation of the orientable mirror.

The displacements indicated above allow displacement of the image of the filter on the spatial light modulator in such a way that each sequence of displacements of the image of the filter on the entrance face of the spatial light modulator allows the successive illumination of each pixel of the spatial light modulator by all the elementary filters of one and the same block. Hence, this makes it possible to color an image of the spatial light modulator.

Moreover, provision may be made, during each image frame, for each pixel of the spatial light modulator to be illuminated successively by all the elementary filters of a block under the effect of a first sequence of displacements, then by all the elementary filters of another block under the effect of a second sequence of displacements.

According to this variant, piracy with the aid of camcorders may be rendered even more difficult through the invention. Specifically, the invention will make it possible to display, with a random sequence, images exhibiting colored structures when they are displayed by a camcorder. These colored structures are not visible to the eye on the image projected from the spatial modulator, because the eye produces an analog sliding average of the various sub-frames. These colored structures will on the other hand be visible on the video tape of the camcorder that recorded the projected image, owing to the fact that the temporal sampling carried out by the camcorder may no longer correspond to the temporal sampling of the image sub-frames displayed by the spatial modulator of the system according to the invention. The scrambling of the video image emanating from the camcorder may deter the commercialization of such a pirated video.

Preferably, all the sequences of displacements controlled by the control device are adapted so that the integration of the images of the filter that are obtained over the set of displacements of the sequence or sequences of each frame imparts a white colorimetry to the entrance face of the spatial light modulator. If each frame comprises just a single sequence, each sequence imparts on its own a white colorimetry. If each frame comprises a combination of sequence, each combination of sequences imparts a white colorimetry without, however, each sequence imparting only a white colorimetry.

In the case where each frame comprises a first sequence and at least one second sequence, these sequences are then preferably adapted so that the integration of the images of the filter that are obtained over the set of displacements of any one of these sequences imparts a nonwhite colorimetry to the entrance face of the spatial light modulator; as only the succession of several sequences imparts a white colorimetry, such an arrangement will lead to the impairment of the images of the spatial light modulator that are filmed by a camcorder.

To more effectively prevent piracy by a camcorder, preferably, the control device possesses the characteristics of various combinations of at least two sequences of displacements, chosen from among a plurality, each combination making it possible to impart a white colorimetry of the entrance face of the spatial light modulator. The control device then selects, from among these combinations, different combinations for successive frames. It is not vital to change combination between each frame, but only between certain frames, which may be chosen at random. Preferably, the selection of combination from among the plurality is also random.

Moreover, provision may be made for said control device to possess the characteristics of a plurality of different sequences of displacements making it possible to impart a white colorimetry to the entrance face of the spatial light modulator and for this device to select, from among this plurality, different sequences for successive frames. If the integration time of an image recorded by a camcorder overlaps two frames of different sequences, this will advantageously culminate in an impairment of the images of the spatial light modulator that are filmed by this camcorder. It is not vital to change sequence between each frame, but only between certain frames, which may be chosen at random. Preferably, the selection of sequences from among the plurality is also random.

BRIEF DESCRIPTION OF THE DRAWINGS

The various subject matter and characteristics of the invention will become more clearly apparent in the description which follows given by way of nonlimiting example and in the figures which represent:

FIGS. 6a to 6l, figures making it possible to explain the operation of the system of the invention;

FIGS. 7a to 7c, of the illustration of camcorder anti-piracy operation;

DESCRIPTION OF THE PREFERRED EMBODIMENTS

Figure 1:
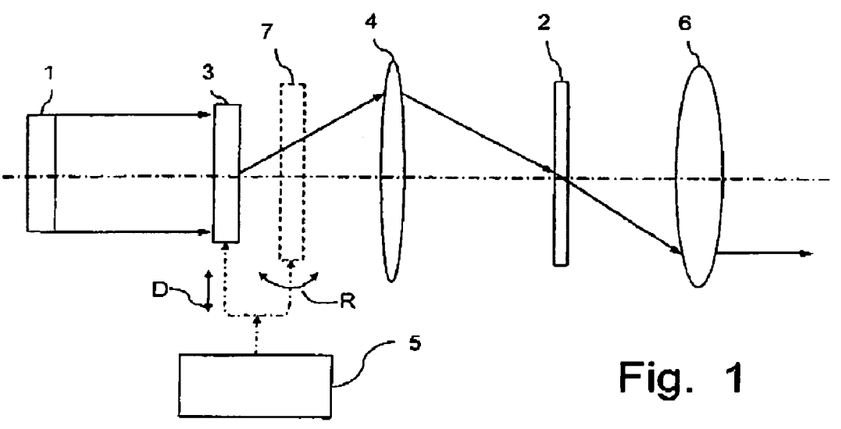
FIG. 1, a general exemplary embodiment of the system of the invention.
Figure 2:
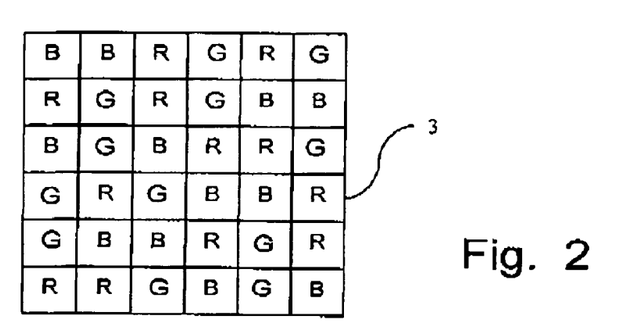
FIG. 2, an exemplary matrix filter applied in the system of FIG. 1.

Referring to FIGS. 1 and 2, a general exemplary embodiment of the system of the invention will therefore be described.

This system comprises a light source preferably emitting a beam of white light making it possible to illuminate a spatial light modulator 2. This spatial light modulator comprises a set of pixels (image elements) arranged in matrix form and is for example a liquid crystal valve. A filter 3 makes it possible to spatially filter the various wavelengths corresponding to the red, green and blue colors so as to illuminate the spatial light modulator 2 with beams of various colors.

A transmission optic 4 makes it possible to image each point of the filter 3 in substantially the plane of the spatial light modulator 2. Moreover, in the case of a projection or back-projection application, an exit optic 6 makes it possible to configure the beam transmitted by the spatial light modulator.

The filter 3 possesses a set of elementary filters of different colors (that is to say of different wavelength filtering characteristics). Preferably, each elementary filter makes it possible to illuminate an integer number greater than one of pixels of the spatial light modulator.

FIG. 2 represents an example of a filter according to the invention embodied in the form of a bidimensional matrix, that is to say organized in rows and columns, of red (R), green (G) and blue (B) elementary filters. The distribution of the various elementary filters R, G and B will be explained later.

A control device 5 makes it possible to displace the spatial filtering of the illumination beam, this amounting to displacing the image of the filter 3 on the entrance face of the spatial light modulator 2. As is represented in FIG. 1, the control device 5 can control this displacement:

either by displacing the filter 3 perpendicularly to the direction of the illumination beam as indicated by the arrow D;

or by providing a beam deflection or translation device 7 between the filter 3 and the spatial light modulator 2. For example, in FIG. 1, a deflection of the beam transmitted to the spatial light modulator is obtained by rotating the device 7 as indicated by the arrow R.

The control device 5 thus controls the displacement of the image of the filter on the entrance face of the spatial light modulator 2. This displacement is made step by step along two orthogonal directions so that the image of the filter displaces over the entrance face of the spatial light modulator in two orthogonal directions parallel to the rows and to the columns. With each displacement, the displacement pitch is equal to a multiple of the distribution pitch of the images of the elementary filters of the filter 3 on the entrance face of the spatial light modulator.

Let us consider that the point p2 of the spatial light modulator is illuminated by an elementary filter situated at the point p3 of the filter.

At an instant t0, the elementary filter located at the point p3 is of a determined color, red for example and the pixel situated at the point p2 of the spatial light modulator is illuminated by red light. At an instant t1 thereafter, under the control of displacement of the filter 3 by the device 5, the elementary filter located at the same point p3 is green (for example) and the pixel of the point p2 is illuminated by green light. At another instant t2, the elementary filter located at p3 may thereafter be blue and the pixel situated at p2 is illuminated by blue light.

The distribution of the elementary filters R, G and B of the filter 3 is effected in such a way that by providing appropriate displacements of the filter, a light is obtained which is on average perceived as white for all the pixels of the spatial light modulator when these pixels are in the on state for the various positions of displacements, this being so for an integration time suitable for the eye.

In the case where the control device gives rise to a displacement of the image of the filter over the entrance face of the spatial light modulator by deflection of the beam transmitted by the filter for example, operation is similar.

A processing of the synchronous signal will supply the imager with video signals combining the initial images of the three colors according to a pattern identical to that of the colored filters. The control device 5 will operate in synchronism with the video signals.

Each sub-image will then contain pixels of the three colors, according to a random or pseudo-random pattern, and this will no longer place contours of colors at different instants but will distribute them over time. This will attenuate the phenomenon of color break-up.

Figure 3:
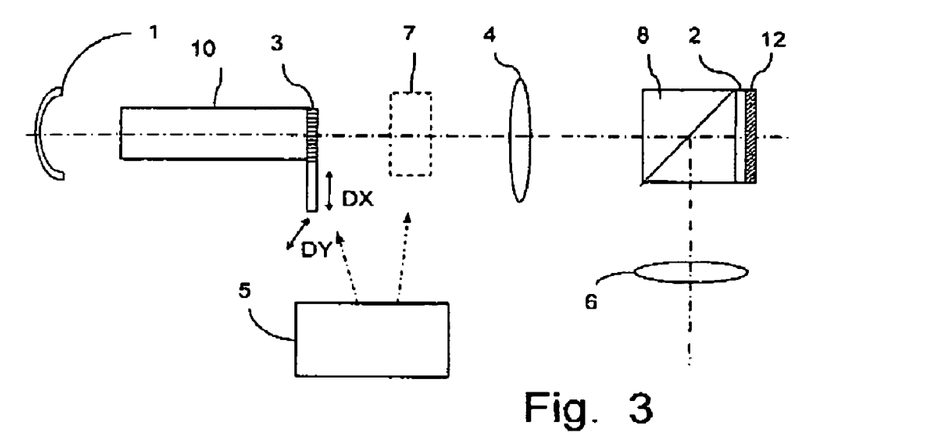
FIG. 3, an exemplary embodiment of the system of the invention.

FIG. 3 represents an exemplary embodiment of a projection system using the illumination system according to the invention. In this figure are again found the light source 1, the filter 3, the optic 4, the spatial light modulator 2, the exit optic 6, the beam deviation or translation device 7 and the control device 5 of FIG. 1.

A light integrator device, which may be embodied in the form of an integrator bar 10, is interposed between the source 1 and the filter 3 so as to provide uniform illumination of the surface of the filter 3 and subsequently of the surface of the spatial light modulator.

Moreover, in the case, for example, of a spatial light modulator operating by reflection, provision may be made for a beam splitter 8 associated with the entrance face of the spatial light modulator whose opposite face is reflecting or is furnished with a reflection device 12. The light originating from the filter is transmitted to the spatial light modulator which modulates it spatially and reflects it toward the splitter, which then reflects the light toward the exit optic 6. It should be noted that the light polarization means necessary for the operation of the spatial light modulator are well known in the art and are not represented in the figure.

The control device 5 makes it possible to displace the filter 3 along two perpendicular directions DX and DY contained in a plane transverse to the direction of the beam transmitted by the integrator bar 10 so as to displace the image of the filter over the entrance face of the spatial light modulator. According to a variant embodiment, a beam deflection or translation device 7 controlled by the device 5 makes it possible to effect this displacement of the image of the filter over the entrance face of the spatial light modulator.

Figure 4:
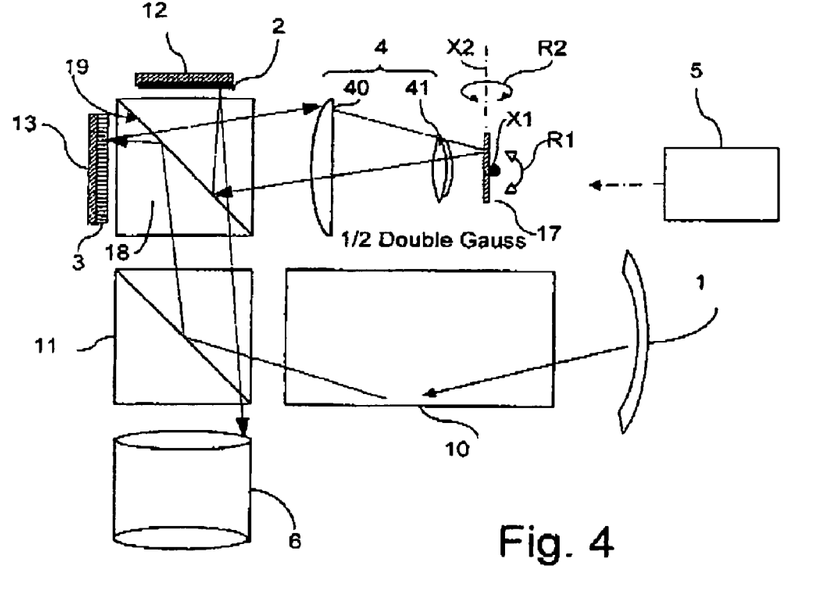
FIG. 4, a variant embodiment of the system of the invention.

Referring to FIG. 4, a variant embodiment of a projection system applying the illumination system of the invention and which has the advantage of being compact will be described.

The filter 3 and the spatial light modulator 2 are arranged symmetrically with respect to a light splitting surface 19. According to the exemplary embodiment of FIG. 4, this surface 19 is the splitting surface of a beam splitter cube 18.

The filter 3 is furnished with a reflection device 13 so that the light that it receives from a light source and from an integrator device 10 through a beam splitter 11 and through the splitting surface 19 is reflected toward an optic 4 and a mirror 17. The light reflected by the mirror 17 is returned by the optic 4 and the splitting surface 19 to the spatial light modulator 2.

The light therefore performs a double pass through the optic 4; the latter is designed as a double Gauss optic so that by reason of the symmetric positions of the filter 3 and of the spatial light modulator 2 with respect to the splitting surface 19, as well as of the double pass of the light through the optic 4, the surface of the filter is imaged on the entrance surface of the spatial light modulator 2 with magnification 1 and without distortion.

As may be seen in FIG. 4, the mirror 17 is movable about two perpendicular axes X1 and X2. Rotation commands R1 and R2 instructed by the device 5 make it possible to displace the image of the filter 3 over the entrance face of the spatial light modulator in two perpendicular directions, horizontally and vertically in particular.

When the mirror is perpendicular to the direction of the beam that it receives from the filter, it is in a mean position. Operation in which the rotations R1 and R2 cause the mirror to oscillate about this mean position will be favored.

The spatial light modulator 2 is furnished on its face opposite its entrance face with a reflection device 12. The light originating from the filter 3 and illuminating the spatial light modulator is therefore reflected toward the exit objective 6. As before, the means of polarization necessary for the operation of the system are entirely known in the art and are therefore not represented in the figure.

Referring to FIGS. 5a to 5f, the design of a filter 3 according to the invention will now be described.

As indicated earlier, this filter comprises a matrix of colored elementary filters, that is to say ones having different optical wavelength filtering characteristics. The distribution of the elementary filters is such that the filter 3 exhibits a repetition of patterns each consisting of a determined number of elementary filters. For example, FIGS. 5b and 5c represent a pattern of 3×3 elementary filters and FIGS. 5d and 5e represent a pattern of 6×6 elementary filters. It is of course obvious that a pattern could comprise more elementary filters.

A method for obtaining these patterns is as follows; in an m×n matrix where m×n is a multiple of three, choose a shape of a block of three elementary filters for example (in the case of three-color operation) such as the shape of FIG. 5a to produce the patchwork of FIG. 5b (or that of FIG. 5d).

The distribution of the elementary filters R, G and B may be different in the various blocks of three elementary filters. Thus, block M1 is different from block M2 as regards the distribution of the elementary filters R, G and B.

The colors of the elementary filters are laid out randomly over the various shapes while nevertheless preferably complying with overall homogeneity criteria (e.g.: same number of pixels of each color for the rows and the columns of the matrix).

The patterns obtained (FIG. 5c or 5e) will be replicated by translation so as to cover the totality of the filter 3.

It will be noted that in order to take account of the displacement of the image of the filter 3 on the surface of the spatial light modulator 2 and in order in all cases for this image to cover the spatial light modulator, a filter of larger surface area than that of the spatial light modulator will be provided. If there are provided translations of ±1, ±2 or ±3 elementary filters, the dimensions of the filter will be increased by rows and by columns corresponding to one to three rows and one to three columns of elementary filters of the pattern in each direction.

The operation of the system when the image of the filter on the surface of the spatial light modulator is displaced will now be described.

For each color image to be generated, a starting position will be defined for the displacement device from among all the possible positions (for example for an excursion of ±2 pixels in each direction 25 positions are possible, 9 positions for ±1 pixel in each direction). This position will generate the first sub-frame by imaging red, green and blue pixels through the patterns of the filter 3.

Let us assume that the filter 3 is embodied through the assemblage of four patterns such as that of FIG. 5e. FIG. 5f represents the image of the filter on the entrance face of the spatial light modulator.

Let us assume that we were to observe the position X of the image of FIG. 5f (column 7 and row 8 of the image).

During the first sub-frame, this position is illuminated in red.

Figure 5A:
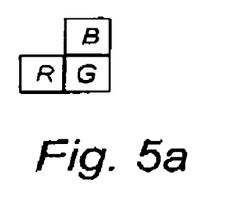
FIGS. 5a to 5f, exemplary embodiments of a filter according to the invention.
Figure 5B:
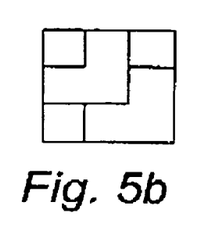
Figure 5C:
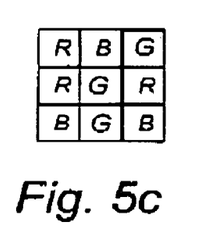
Figure 5D:
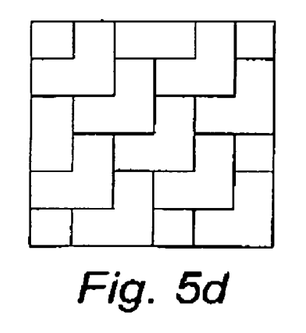
Figure 5E:
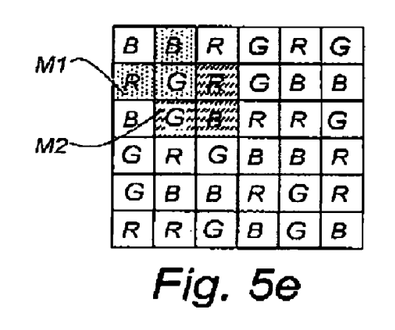
Figure 5F:
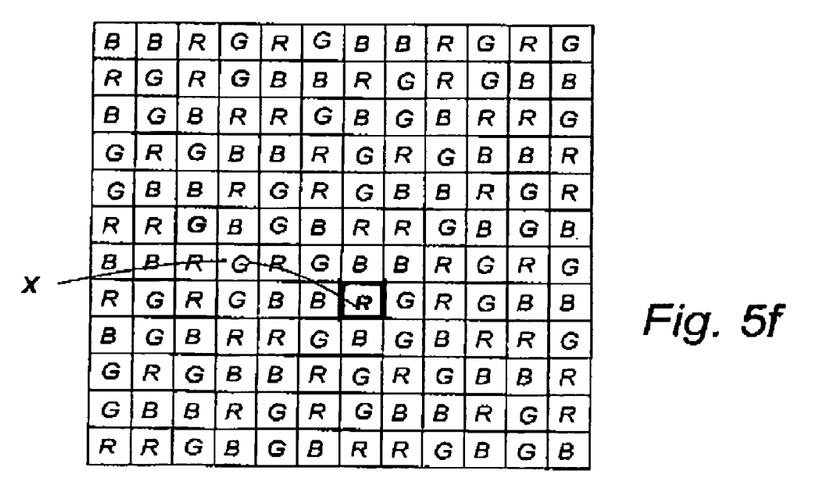

The following two sub-frames will have to be illuminated after displacements complying with the shape of FIG. 5a so that the majority of the positions of the spatial light modulator are illuminated by the three colors. For example, for the second sub-frame, the pattern will have to be translated by an elementary filter leftward so that a green elementary filter (row 8, column 8) illuminates the position X of the modulator. Thereafter, for the third sub-frame, it is the blue elementary filter of row 7 and of column 8 which will illuminate the position X, doing so through a translation of an elementary filter downward. The shapes of FIG. 5a being distributed regularly in the pattern of FIG. 5b and subsequently, in the filter of FIG. 5c, it is therefore seen that all the positions such as X of the spatial light modulator will have been illuminated by red, green and blue light after two displacements of the image of the filter over the surface of the spatial light modulator. If all the pixels of the spatial light modulator are on during the whole of this sequence, the observer then observes a light transmitted by the modulator which is the combination of red, of green and of blue and which is therefore white.

In certain cases, it is noted that it may happen that the fact of having, in the filter 3, neighboring elementary filters of like color leads to having, after three displacements during three sub-frames, an image which is not perfectly white. To remedy this, provision is made to rebalance the colorimetry by three additional displacements during the three subsequent sub-frames. FIGS. 6a to 6l illustrate this operation.

Figure 6A:
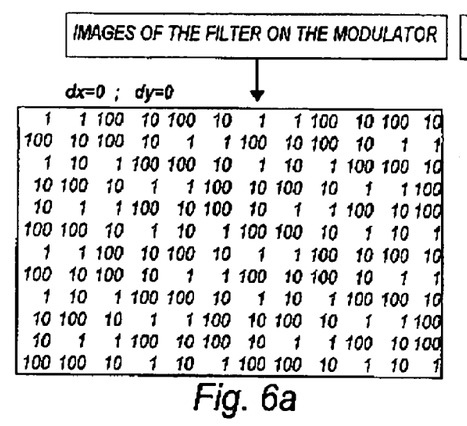

FIG. 6a represents the image of the filter on the useful part of the spatial light modulator in the form of a matrix of numbers. Each number represents a color:

a "1" represents blue;
a "10" represents green;
a "100" represents red.

In what follows, the units numeral will represent blue, the tens numeral green and the hundreds numeral red. This implies that a point represented by a number 110, for example, will contain red color and green color but will not contain blue.

Figure 6B:
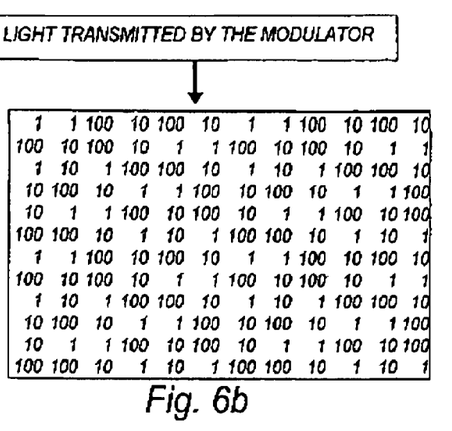

The image of the filter of FIG. 6a is projected onto the entrance face of the spatial light modulator at a determined instant while it is in a determined position x=0 and y=0. It is assumed that all the pixels of the modulator are on. FIG. 6b represents the image that ought to be perceived by an observer who observes the image displayed by the spatial light modulator. This image is for the moment that of the image of the filter. In particular the point of row 8 and of column 8 has the value 10 (green).

The image of the filter will be displaced in such a way as to describe a block shape such as represented in FIG. 5a.

Figure 6C:
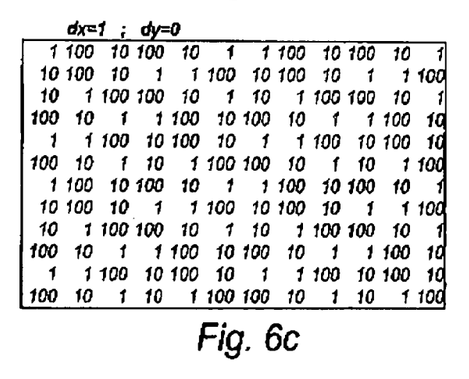
Figure 6D:
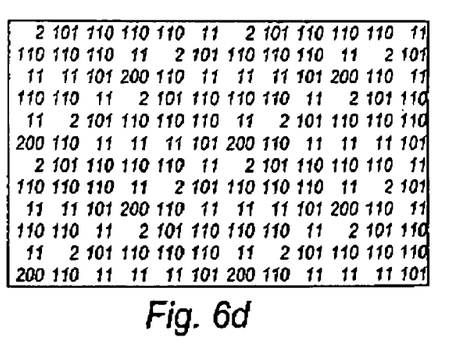

In FIG. 6c, the image of the filter is displaced by one pitch leftward (x=1 and y=0). An observer ought to perceive, in FIG. 6d, the superposition of the image of FIG. 6b and the image of FIG. 6c. For example, the point of row 8 and of column 8 has the value 110 and he ought to perceive a superposition of red and green, i.e. yellow.

In FIG. 6e, the image of the filter is displaced by one pitch downward (x=1 and y=1). An observer ought to perceive the superposition of the image of FIG. 6d and the image of FIG. 6e. This is represented by FIG. 6f. For example, the point of row 8 and of column 8 has the value 210 and he ought to perceive a superposition of red and of green, the red then being twice as intense as the green, i.e. an orange color.

The integration of the various images viewed by the observer does not give a white image. In particular; for example, it may be seen that the point of row 8, column 8 comprises no blue color and comprises red that is twice as intense as the green.

The image of the filter will therefore be displaced again so as to make it describe a shape such as that of FIG. 5a.

In FIG. 6g, the image of the filter is displaced, for example by three pitches leftward for example (x=4 and y=1). An observer ought to perceive, in FIG. 6h, the superposition of the image of FIG. 6f and the image of FIG. 6g. For example, the point of row 8 and of column 8 has the value 220 and he ought to perceive a superposition of red and of green (yellow color).

Figure 6I:
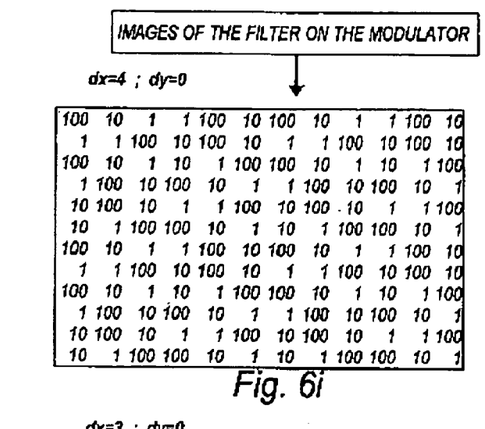
Figure 6J:
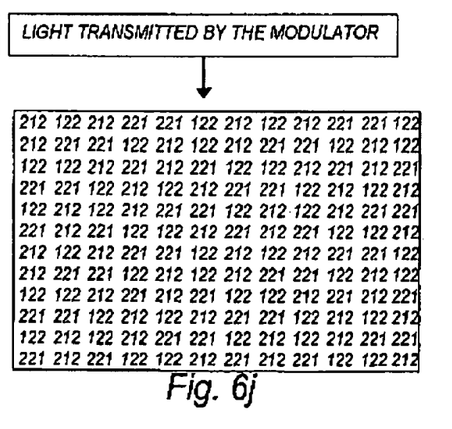

In FIG. 6i, the image of the filter is displaced thereafter by one pitch downward (x=4 and y=0) An observer ought to perceive, in FIG. 6j, the superposition of the image of FIG. 6i and of the image of 6h. The point of row 8 and of column 8 has the value 221 and the observer ought to perceive a superposition of red, of green and of blue, with a weaker intensity of blue.

Figure 6K:
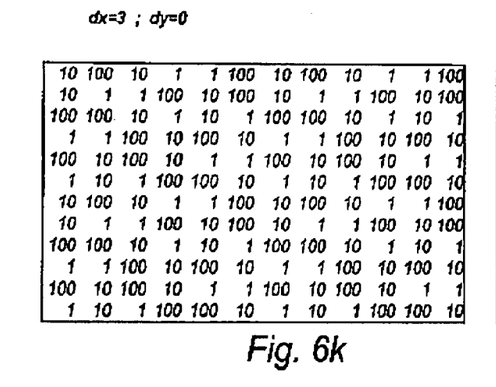
Figure 6L:
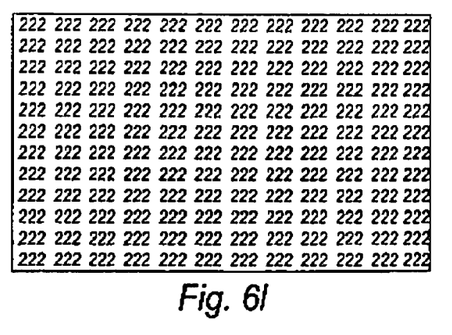

In FIG. 6k, the image of the filter is displaced finally by one pitch rightward (x=3 and y=0). An observer ought to perceive, in FIG. 6l, the superposition of the image of FIG. 6k and the image of FIG. 6j. The point of row 8 and of column 8 has the value 222. After integration of the various images produced in the course of the various preceding displacements, the observer therefore perceives a white light at the point of row 8, column 8. By analyzing the behavior of the various points of the spatial light modulator it would be noted that the same holds for all the points. The observer therefore perceives a spatial light modulator which emits a light that is uniformly white on average (all the pixels of the modulator obviously being on as assumed earlier).

In the exemplary embodiment above, the following sequence of displacements of the image of the filter has been effected:

| dx      | dy |
|---------|----|
| 0       | 0  |
| 1       | 0  |
| 1       | 1  |
| 4 or −2 | 1  |
| 4       | 0  |
| 3       | 0  |

Other sequences of displacements may be selected so as to have a white colorimetry of the spatial light modulator when the pixels of the latter are on. The invention therefore makes provision to establish a selection of these sequences of displacements and to give each of them their characteristics such as the position of the origin of displacement and the types of displacements along two coordinates, X and Y. Thereafter, the invention makes provision to choose a sequence of displacements at each frame. The sequence of displacements may be different from one frame to the next, but this may well not be systematic and be decided randomly.

To establish this selection it is possible, for example, on the basis of the previous sequence of displacements, to deduce a following sequence by translation of +1, +1. The sequence which follows is therefore a valid sequence:

| dx      | dy |
|---------|----|
| 1       | 1  |
| 2       | 1  |
| 2       | 2  |
| 5 or −1 | 2  |
| 5       | 1  |
| 4       | 1  |

Another method for obtaining other valid sequences of displacements is to permute the orders of displacements within one and the same sequence. This amounts for example to permuting the first three points of the above path among one another and to permuting the last three points of the above path among one another. The sequence deduced from the first sequence described earlier is thus obtained:

| dx | dy |
|---|---|
| 1 | 0 |
| 0 | 0 |
| 1 | 1 |
| 4 or −2 | 0 |
| 3 | 0 |
| 4 | 1 |

Other valid sequences may be found by other methods.

The control device 5 will control the changes of sequence of displacements. These changes will preferably take place between two image frames.

Provision may be made to supply the control device 5 with a list of sequences of displacements each independently making it possible to obtain a white colorimetry of the image of the filter. The device will choose in a predetermined manner, or in a random manner, the sequences of displacements to be used.

For the application of operation in which the white colorimetry is obtained after several sequences of displacements, the control device 5 will be supplied with a list of combinations of sequences making it possible to obtain a white colorimetry of the image of the filter. In this case of combinations of sequences, preferably, each sequence of displacements taken on its own will not make it possible to obtain a white colorimetry, and this will be useful in combating piracy, with the aid of a camcorder, of the images displayed by the spatial light modulator, as will be clarified hereinafter.

A random combination of all these valid paths will therefore allow a "coding" of the images according to colors, doing so according to nonrepetitive sequences. This coding will not be easily decodable by a pirate, all the more so since the camcorder will have carried out a resampling and a spatial and temporal averaging thereof.

The disturbance imparted to the video signal appears when there is no correspondence between the sampling time of a camcorder and the display time for sub-frames.

Figure 7A:
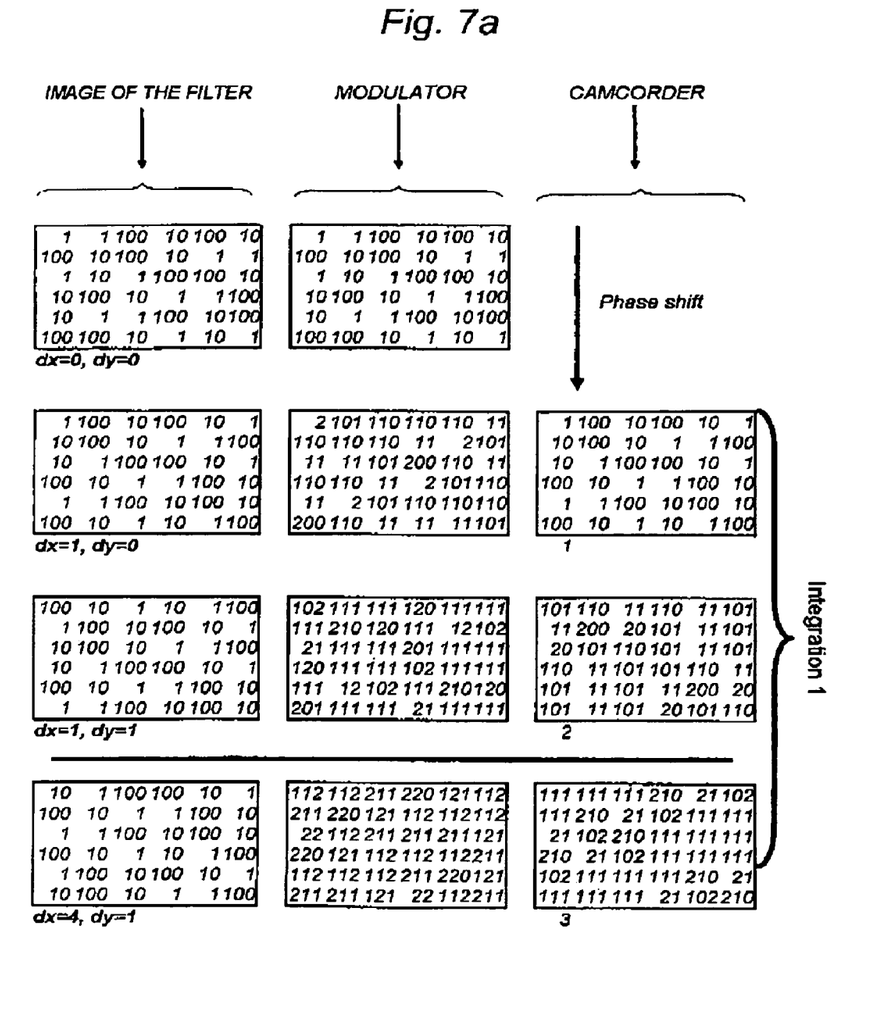
Figure 7B:
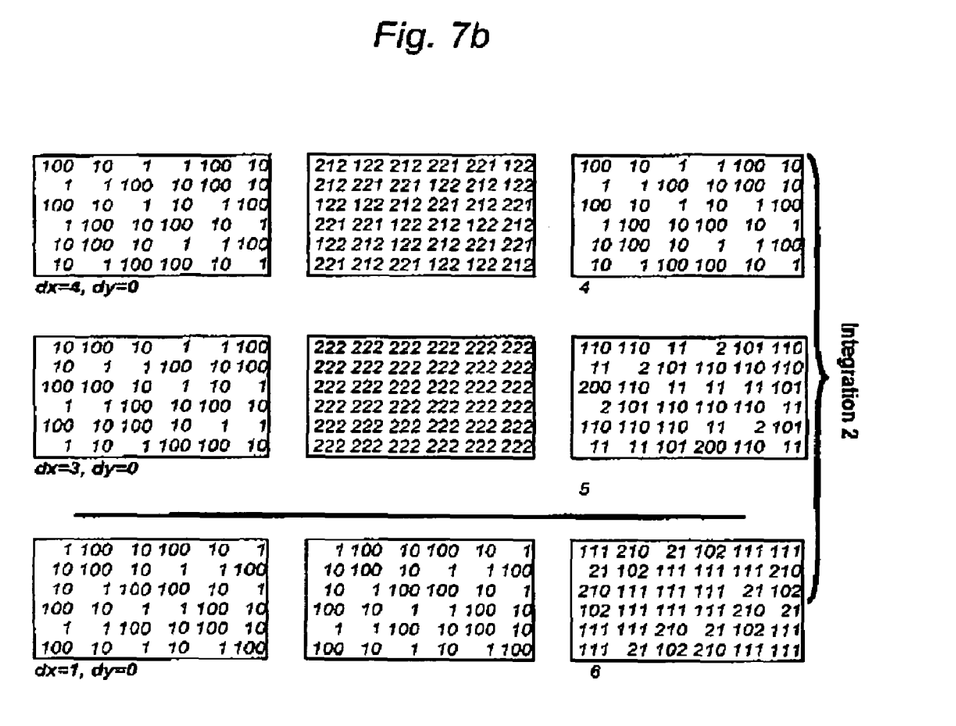

In the case identical to that described earlier where a sequence of displacements of the filter is spread over two sequences so as to form six consecutive sub-frames organized in such a way that the signal integrated over these sub-frames is white (when the totality of the spatial light modulator is on), and in the case where the acquisition by a camcorder is done over three sub-frames only which straddle the six sub-frames, the video recording of the camcorder will mix two color codings and will therefore create visible artifacts as explained in the example hereinafter and illustrated by FIGS. 7a to 7c.

To simplify the example it is assumed that the acquisition frequency is locked to the display frequency and that the offset is constant, equal to a sub-frame. In the example of sequences presented in the table below, the three sub-frames a, b and c acquired by a camcorder for the integration 1 do not represent the output state of the camcorder but the progress of the temporal integration of the light signal. the output image is the third sub-frame (sub-frame c for integration 1). In an exemplary operation that is clarified by FIGS. 7a to 7c, the display has been effected using the following sequences of displacements:

| Sub-frame | dx | dy | |
|---|---|---|---|
|   | 0 | 0 | |
| A | 1 | 0 | |
| B | 1 | 1 | ) Integration 1 |
| C | 4 | 1 | |
|   | 4 | 0 | |
|   | 3 | 0 | ] Integration 2 |

Then

| dx | dy | |
|---|---|---|
| 1 | 0 | ] |
| 0 | 0 | |
| 1 | 1 | ) Integration 3 |
| 4 | 0 | |
| 3 | 0 | |
| 4 | 1 | ] Integration 4 |

Then a sequence beginning with:

| dx | dy | |
|---|---|---|
| 1 | 0 | ] |

In the FIGS. 7a to 7c is represented the manner of operation relating to a part of the filter of FIG. 5f (the part situated at the top left of FIG. 5f). Just as for FIGS. 6a to 6l, the successive images of the filter that are projected onto the spatial light modulator during each displacement are represented in the left parts of these figures. In the central part of these figures is represented the integration of the images on the spatial light modulator when these images correspond to those of the right part of FIGS. 6a to 6l. In the right part are represented the integrations preformed by a camcorder filming these images.

As mentioned before, the integration 1 by the camcorder is out of phase with respect to the projected images. It is noted, in these figures, that the results of the integration do not therefore correspond to expectations. In FIGS. 7b and 7c, it may be seen in particular that integrations 2, 3 and 4 are far from giving a white field. In integrations 3 and 4 in particular (images 9 and 12), it is noted that the proportion of white pixels (level 111) is only 22%, the other pixels being colored. This occurs for a uniform illumination and all the pixels of the spatial light modulator being on. It is therefore necessary to add to these defects those related to the changes of images which occur. Specifically, images 2, 5, 8 and 11 are each obtained after cycles of three sub-frames. Between images 2 and 3, 5 and 6, 8 and 9, 11 and 12, there are therefore changes of images and the integrations by the camcorder will systematically integrate mutually different images, and this will impair the quality of the image.

Figure 8A:
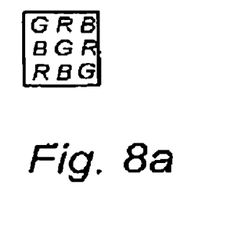
FIGS. 8a to 8c, a variant embodiment of the filter according to the invention.
Figure 8B:
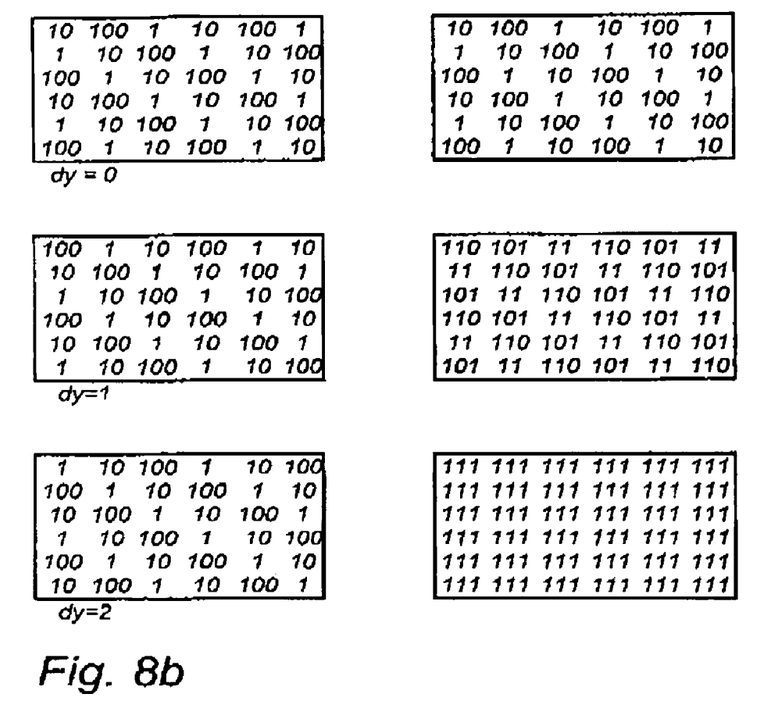
Figure 8C:
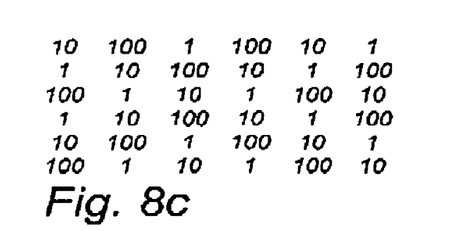

Referring to FIGS. 8a to 8c, a variant embodiment of the filter of the invention will now be described. This variant relates to the embodying of a filter with the aid of simpler blocks such as is represented in FIG. 8a. This arrangement reduces in particular the proximity of blocks of like color. It is obtained by juxtaposing linear patches where the three colors R, G and B are aligned. The displacement of the filter is advantageously done in a single direction, along X or Y, and three sub-frames are sufficient here to attain the white state (see FIG. 8b).

The diagonal alignment of the colors may turn out to be detrimental to the viewing. This may be countered by advantageously interchanging pairs of rows or columns so as to scramble the pattern while avoiding juxtaposing the same color twice.

Thus in FIG. 8c, columns 4 and 5 and rows 4 and 5 have been interchanged.

It should be noted that the system of the invention is applicable to systems providing an intermediate display between the source and the spatial light modulator 2 and making it possible to supply a relay image. In this case the filter 3 may advantageously be associated with this intermediate display.

The invention claimed is:

1. A system for displaying images with the aid of a spatial light modulator wherein the system comprises:
 a light source emitting an illumination beam;
 the spatial light modulator comprising a matrix of pixels controlled by video control signals corresponding to a succession of image frames to be displayed;
 a matrix filter formed of a mosaic of adjacent elementary filters of various colors, illuminated by said illumination beam and transmitting a spatially filtered color beam to the spatial light modulator,
 means for producing an image of said filter on an entrance face of the spatial light modulator;
 means of displacement for displacing said image of the filter on the entrance face of the spatial light modulator and
 a device for controlling these means of displacement, making it possible to control at least one sequence of displacements of the image of the filter during each image frame.

2. The system for displaying images as claimed in claim 1, wherein the dimensions and the position of each elementary filter are adapted so that the image of each of them on the entrance face of the spatial modulator covers a plurality of pixels.

3. The system for displaying images as claimed in claim 2, wherein each displacement of a sequence corresponds to a multiple of the dimension of the image of an elementary filter on the entrance face of the spatial modulator.

4. The system for displaying images as claimed in claim 3, wherein said mosaic is monodimensional and includes only one column of elementary filters of various colors.

5. The system for displaying images as claimed in claim 3, wherein said mosaic is bidimensional and in that said elementary filters are arranged in several rows and several columns.

6. The system for displaying images as claimed in claim 5, wherein said mosaic is formed by the repetition of blocks of elementary filters, and in that these blocks exhibit identical contours and are each composed of at least two elementary filters of different colors.

7. The system for displaying images as claimed in claim 6, wherein said mosaic is an assemblage of identical patterns each comprising the same number of blocks and the same number of elementary filters of each color in each of the rows and in each of the columns of said pattern.

8. The system for displaying images as claimed in claim 6, wherein each sequence of displacements of the image of the filter on the entrance face of the spatial light modulator allows the successive illumination of each pixel of the spatial light modulator by all the elementary filters of one and the same block.

9. The system for displaying images as claimed in claim 8, wherein, during each image frame, each pixel of the spatial light modulator is illuminated successively by all the elementary filters of a first block under the effect of a first sequence of displacements, then by all the elementary filters of at least one second block under the effect of at least one second sequence of displacements.

10. The system for displaying images as claimed in claim 5, wherein all the sequences of displacements controlled by said control device are adapted so that the integration of the images of the filter that are obtained over the set of displacements of the sequence or sequences of each frame imparts a white colorimetry to the entrance face of the spatial light modulator.

11. The system for displaying images as claimed in claim 10, wherein said first and at least second sequences of displacements are adapted so that the integration of the images of the filter that are obtained over the set of displacements of any one of these sequences imparts a nonwhite colorimetry to the entrance face of the spatial light modulator.

12. The system for displaying images as claimed in claim 10, wherein said control device possesses the characteristics of a plurality of different sequences of displacements making it possible to impart a white colorimetry to the entrance face of the spatial light modulator and in that it selects, from among this plurality, different sequences for successive frames.

* * * * *